(12) United States Patent
Kajigaya

(10) Patent No.: US 9,477,498 B2
(45) Date of Patent: Oct. 25, 2016

(54) INFORMATION PROCESSING DEVICE, LIBRARY LOADING METHOD, AND COMPUTER READABLE MEDIUM

(71) Applicant: NEC CORPORATION, Tokyo (JP)

(72) Inventor: Keisuke Kajigaya, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/879,305

(22) Filed: Oct. 9, 2015

(65) Prior Publication Data

US 2016/0132343 A1    May 12, 2016

(30) Foreign Application Priority Data

Nov. 10, 2014   (JP) ................................. 2014-228181

(51) Int. Cl.
| | | |
|---|---|---|
| *G06F 13/00* | (2006.01) | |
| *G06F 9/445* | (2006.01) | |

(52) U.S. Cl.
CPC ....... *G06F 9/44521* (2013.01); *G06F 9/44536* (2013.01); *G06F 8/60* (2013.01)

(58) Field of Classification Search
CPC ........................... G06F 9/445; G06F 9/44521
USPC .......................... 717/163, 166; 719/331, 332
See application file for complete search history.

(56) References Cited

U.S. PATENT DOCUMENTS

| | | | | | |
|---|---|---|---|---|---|
| 5,615,400 | A | * | 3/1997 | Cowsar ................. | G06F 9/4428 711/118 |
| 8,739,147 | B2 | * | 5/2014 | Lebert ................. | G06F 9/44563 717/162 |
| 2008/0243965 | A1 | * | 10/2008 | Jung ................... | G06F 9/44563 707/999.206 |

FOREIGN PATENT DOCUMENTS

| | | |
|---|---|---|
| JP | 2007-206965 A | 8/2007 |
| JP | 2010-113474 A | 5/2010 |
| JP | 2013-196453 A | 9/2013 |

* cited by examiner

*Primary Examiner* — Andy Ho
(74) *Attorney, Agent, or Firm* — Sughrue Mion, PLLC

(57) ABSTRACT

Provided is an information processing device and others in which a plurality of applications are capable of appropriately using a plurality of libraries requested to be loaded with an identical name and including different contents. The information processing device includes an identifier generation unit which generates identifier information used for identifying contents of a library file, generates load request association information representing a relationship between the identifier information and request target information; a load request interpretation unit which obtains identifier information about the library file including a target of a load request; and a load unit which loads at least a part corresponding to the target of the load request from the library file indicated by the obtained identifier information when the load unit determines that the part corresponding to the target of the load request is not loaded.

20 Claims, 10 Drawing Sheets

Fig. 7

| ITEM NUMBER | PACKAGE NAME | UNIQUE ID |
|---|---|---|
| A1 | org.apache.commons.beanutils.converters | 0c41fee1b50b22ac23ac99388f649b9a634e8346 |
| A2 | org.apache.commons.beanutils.expression | 0c41fee1b50b22ac23ac99388f649b9a634e8346 |
| A3 | org.apache.commons.beanutils.locale.converters | 0c41fee1b50b22ac23ac99388f649b9a634e8346 |
| A4 | org.apache.commons.beanutils.locale | 0c41fee1b50b22ac23ac99388f649b9a634e8346 |
| A5 | org.apache.commons.logging | f6f66e966c70a83ffbdb6f17a0919eaf7c8aca7f |
| A6 | org.apache.commons.logging.impl | f6f66e966c70a83ffbdb6f17a0919eaf7c8aca7f |

| ITEM NUMBER | PACKAGE NAME | UNIQUE ID |
|---|---|---|
| B1 | org.apache.commons.beanutils.converters | 0c41fee1b50b22ac23ac99388f649b9a634e8346 |
| B2 | org.apache.commons.beanutils.expression | 0c41fee1b50b22ac23ac99388f649b9a634e8346 |
| B3 | org.apache.commons.beanutils.locale.converters | 0c41fee1b50b22ac23ac99388f649b9a634e8346 |
| B4 | org.apache.commons.beanutils.locale | 0c41fee1b50b22ac23ac99388f649b9a634e8346 |
| B5 | org.apache.commons.logging | 37c659e57293656ebef1a247fc6ceb738ebdfc74 |
| B6 | org.apache.commons.logging.impl | 37c659e57293656ebef1a247fc6ceb738ebdfc74 |

137

| ITEM NUMBER | UNIQUE ID | REFERENCE NUMBER |
|---|---|---|
| C1 | 0c41fee1b50b22ac23ac99388f649b9a634e8346 | 2 |
| C2 | f6f66e966c70a83ffbdb6f17a0919eaf7c8aca7f | 1 |
| C3 | 37c659e57293656ebef1a247fc6ceb738ebdfc74 | 1 |

106

INFORMATION PROCESSING DEVICE, LIBRARY LOADING METHOD, AND COMPUTER READABLE MEDIUM

This application is based upon and claims the benefit of priority from Japanese Patent Application No. 2014-228181, filed on Nov. 10, 2014, the disclosure of which is incorporated herein in its entirety by reference.

TECHNICAL FIELD

The present invention relates to a library loading technology for an information processing device (computer) capable of executing an application program.

BACKGROUND ART

Japanese Patent Application Laid-open Publication No. 2014-228181 discloses a method for loading a library into an information processing device capable of executing an application program, in such a manner that the library including a program under which the information processing device performs a function is loaded at the time of execution of the function by the information processing device. According to Java (registered trademark), for example, a module called a class loader is generally used to load a program from a library in response to a class loading request issued from an application.

It is further known that there exist various types of library versions having an identical name but including different contents as a result of functional enhancement or difference in sources, or for other reasons. For example, there is such a case when a library version used by an application server which provides an execution environment for an application is different from a library version used by the application and having a name identical to the name of the library used by the application server. In this case, there is a possibility that a class loader loads a library including a program with an identical class name but of a different version in response to a load request for a certain class name. When the class loader loads the library for the application server (i.e., library of the different version) in response to a load request from the application, the application does not operate in a normal condition. Accordingly, the class loader needs to select an appropriate library from a plurality of libraries having an identical name in association with the application, and load the selected library.

A related technology for solving this problem, is disclosed in Japanese Patent Application Laid-open Publication No. 2010-113474 (hereinafter referred to as Document 1). In the Document 1, an information processing device uses a plurality of application programs which are capable of using different libraries, each of which includes a class with an identical name within one JVM (Java Virtual Machine). According to the information processing device described in Document 1, a user or the like sets attributes concerning libraries and programs beforehand as table information. Then, a setting means discriminates distributors of the programs on the basis of the table information, and sets paths for library files in association with the discriminated distributors. The information processing device is capable of switching the paths of the library files called during execution of the programs in this manner.

Japanese Patent Application Laid-open Publication No. 2007-206965 (hereinafter referred to as Document 2) discloses an information processing device which switches settings of paths of library files in association with distributors of application programs to be executed. According to the information processing device described in Document 2, a user describes information about versions of libraries in a manifest file or the like beforehand. At the time of loading of a requested class, a class loader selects either a class library provided by an application, or a system library with an identical name based on version information.

Japanese Patent Application Laid-open Publication No. 2013-196453 (hereinafter referred to as Document 3) discloses an information processing device which executes programs described in object-oriented programming languages. The information processing device is capable of loading a class of a desired version. According to the information processing device described in Document 3, an external definition storage unit stores fully qualified class names (FQCN) of classes corresponding load targets and load sources for each class loader. When a class for realizing a class loader is generated, a delegation model intervention means inserts a byte-code for intervention of a delegation model used for loading the class into the generated class based on the load source defined in the external definition storage unit. The information processing device is capable of switching load sources of class libraries in this manner in association with programs to be executed.

According to the information processing devices disclosed in Documents 1 through 3, however, a library including identical contents is loaded for each application at the time of execution of a plurality of applications. This situation produces a problem of increase in the quantity of memory usage by these information processing devices. For example, in case of execution of a plurality of identical applications by the respective information processing devices, a class loader therein loads an identical library already loaded also for the application to be subsequently executed.

SUMMARY

An exemplary object of the invention is to provide an information processing device and others in which a plurality of applications are capable of appropriately using a plurality of libraries requested to be loaded with an identical name and including different contents, while reducing increase in a quantity of memory usage as a result of multiple loading of a library including identical contents.

In order to achieve the above objective, an information processing device which is an aspect of the present invention includes, an identifier generation unit which generates identifier information used for identifying contents of a library file for each library file, generates load request association information representing a relationship between the identifier information and request target information representing a part which is included in the library file and may become a target of an intended load request, and outputs the load request association information to a storage device;

a load request interpretation unit which receives a load request from an application currently executed, obtains identifier information about the library file including a target of the load request based on the load request and the load request association information, and outputs request target information representing the target of the load request and the obtained identifier information; and a load unit which manages load state information representing load states of respective parts included in the library file, loads at least a part corresponding to the target of the load request from the library file indicated by the obtained identifier information when the load unit determines that the part corresponding to the target of the load request indicated by the request target information and by the obtained identifier information is not loaded based on the load state information, and makes a response to the load request.

Further, in order to achieve the above objective, a library loading method of the invention includes, generating identifier information used for identifying contents of a library file for each library file;

generating load request association information representing a relationship between the identifier information and request target information representing a part which is included in the library file and may become a target of an intended load request;

outputting the load request association information to a storage device;

when a load request from an application currently executed is received, obtaining identifier information about the library file including a target of the load request based on the load request and the load request association information;

loading at least a part corresponding to the target of the load request from the library file indicated by the obtained identifier information when it is determined that the part corresponding to the target of the load request indicated by request target information representing the load request target and by the obtained identifier information is not loaded based on load state information representing load states of respective parts included in the library file, and registering, in the load state information, that the part corresponding to the target of the load request has been loaded; and making a response to the load request.

Further, the objective is also achieved by a computer program that causes a computer to implement the information processing device including the configurations described above and a method associated with the device, and by a computer readable storage medium storing the computer program.

BRIEF DESCRIPTION OF THE DRAWINGS

Exemplary features and advantages of the present invention will become apparent from the following detailed description when taken with the accompanying drawings in which:

FIG. 7 is a diagram illustrating an example of a package name association table 127 according to the second exemplary embodiment;

FIG. 8 is a diagram illustrating an example of a package name association table 137 according to the second exemplary embodiment;

EXEMPLARY EMBODIMENT

Next, a detailed explanation will be given for an exemplary embodiment of the present invention with reference to the drawings.

First Exemplary Embodiment

Figure 1:
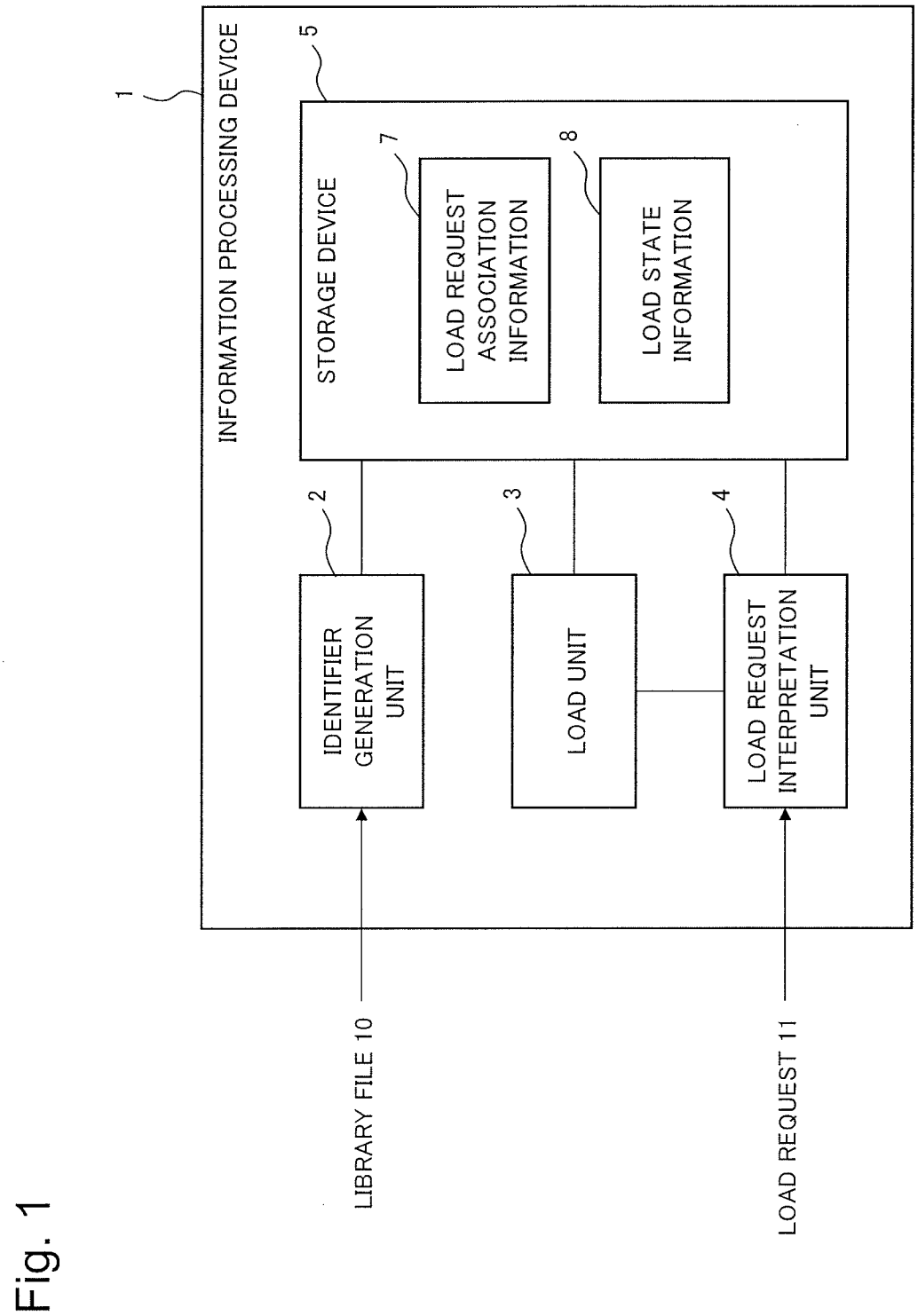
FIG. 1 is a block diagram illustrating a configuration of an information processing device 1 according to a first exemplary embodiment of the present invention.

FIG. 1 is a block diagram illustrating a configuration of an information processing device 1 according to a first exemplary embodiment of the present invention. Referring to FIG. 1, the information processing device 1 according to this exemplary embodiment includes an identifier generation unit 2, a load unit 3, a load request interpretation unit 4, and a storage device 5.

The information processing device 1 may include circuitry, for example, an ordinary information processing device (computer) which operates under control of a computer program (software program) executed by using a CPU (Central Processing Unit: not shown). Alternatively, respective units in the circuitry of the information processing device 1 may include dedicated hardware devices, or logic circuits. A hardware configuration example of the information processing device 1 realized by a computer will be described later with reference to FIG. 10.

The storage device 5 is realized by a semiconductor memory device or a disk device, for example. The storage device 5 is capable of storing load request association information 7, and load state information 8.

The identifier generation unit 2 generates identifier information for each of library files 10 as information used for identifying contents of the respective library files 10. More specifically, the identifier information is information based on which differences in contents of the respective library files 10 are identifiable. The identifier generation unit 2 generates different identifier information for each of the library files 10 with an identical name but of different versions (i.e., including different contents), for example. A well-known and ordinary technology may be adopted to allow the identifier generation unit 2 to identify differences in contents for each of the library files 10, such as generation of hashes and comparison of files, for example.

The identifier generation unit 2 further generates the load request association information 7 showing a relationship between the generated identifier information and request target information representing a part which is included in the corresponding library file 10 and may become a target of a load request. The "part which may become a target of a load request" in this context refers to a part (program) of the library file 10 corresponding to a target of loading designated in a load request 11 issued from an application during execution of an application. The request target information is expressed by a class name, a function name, or a combination of those (the class or the function) names and a library name, for example, in accordance with an application language. The library file 10 may include one or more programs corresponding to load request targets. The identifier generation unit 2 stores (outputs) the generated load request association information 7 in the storage device 5.

The load request interpretation unit 4 receives the load request 11 from an application currently executed. The load request interpretation unit 4 subsequently obtains identifier information about the library file 10 including a target of the load request 11 based on the request target information representing the target of the load request 11 and the load request association information 7. More specifically, the load request interpretation unit 4 interprets the library file 10 for which the load request 11 has been issued, and represents the interpreted library file 10 as the identifier information. The load request interpretation unit 4 outputs the request target information and the obtained identifier information to the load unit 3.

The load unit 3 manages load state information 8 representing load states of respective parts included in the library file 10 for each identifier information. The load unit 3 is capable of determining whether or not a part of the library file 10 indicated by the request target information representing the target of the load request 11, and by the identifier information obtained by the load request interpretation unit 4 (hereinafter such a part referred to as "load-requested part") has been loaded based on the load state information 8.

The load unit 3 executes the following operation when determining that the load-requested part is not loaded based on the request target information representing the target of the load request 11, the identifier information obtained by the load request interpretation unit 4, and the load state information 8. Initially, the load unit 3 loads a part indicated at least by the request target information from the library file 10 indicated by the identifier information obtained by the load request interpretation unit 4. The load unit 3 registers, in the load state information 8, that the part indicated at least by the request target information has been loaded from the library file 10. The load unit 3 stores the load state information 8 in the storage device 5. Then, the load unit 3 sends (makes) a response to the load request 11.

On the other hand, when determining that the load-requested part has been already loaded, the load unit 3 sends (makes) a response to the load request 11 without loading anything. In other words, the load unit 3 prevents execution of multiple loading of the library file 10 including identical contents based on the identifier information.

According to an advantage offered in this exemplary embodiment described herein, a plurality of applications are capable of appropriately using a plurality of libraries requested to be loaded with an identical name and including different contents. Moreover, according to an advantage offered in this exemplary embodiment, reduction of increase in the quantity of memory usage as a result of multiple loading of a library including identical contents is achievable. In other words, there are provided according to this exemplary embodiment, an information processing device and others in which a plurality of applications are capable of appropriately using a plurality of libraries requested to be loaded with an identical name and including different contents, with reduction of increase in the quantity of memory usage as a result of multiple loading of a library including identical contents. These advantages are similarly offered when targets or library files have different target names or different library file names, respectively, for a load request, but include identical contents. Accordingly, there are provided according to this exemplary embodiment, an information processin device are capable of controling in such a manner as to avoid multiple loading of a library including identical contents in response to any types of load requests to be issued.

These advantages are produced from the point that the identifier generation unit 2 generates identifier information in such a manner as to allow identification of a difference in contents of the library files 10 requested to be loaded with an identical name. The advantages also come from the point that the load request interpretation unit 4 interprets the library file 10 including the target of the load request 11 not by the name of the library file, but by the identifier information allocated to each of the contents of the library files. In this case, the load unit 3 is capable of further preventing multiple loading of the library file 10 including identical contents by using the identifier information.

In addition, according to an advantage of this exemplary embodiment, the necessity of preparing prior information about the library files 10 or the applications is eliminated. According to PTLs 1 through 3 described in the section of "BACKGROUND ART", information prepared beforehand, such as attributes, version information, and load sources concerning libraries and programs, are given to the information processing devices. This work is troublesome and time-consuming. However, the work for preparing such prior information is not required according to this exemplary embodiment.

The elimination of this work is realized by the load request association information 7 automatically generated by the identifier generation unit 2 to represent the relationship between the generated identifier information and the request target information representing the target of the load request included in the library file 10.

The following modifications for the exemplary embodiment may be made, for example, as follows.

For example, at the time of generation of the load request association information 7, the identifier generation unit 2 may use information about a part which is included in the library file 10 and may become a target of a load request, as information prepared beforehand. More specifically, list information representing names of functions included in the library file 10 frequently used is prepared beforehand, for example. The identifier generation unit 2 may obtains the list information together with the library file 10. The identifier generation unit 2 may generate the load request association information 7 based on the list information instead of examining the library file 10. This method allows the identifier generation unit 2 to reduce the processing time for obtaining a function name from the library file 10. The foregoing information prepared in this modified example may be only generated for a part of the library files 10 selected as files capable of achieving considerable reduction of the processing time by this method, for example.

According to an advantage offered in this modified example described herein, reduction of processing time required before receiving a load request from an application is achievable.

This advantage is produced from the point that the identifier generation unit 2 reduces processing for examining a part which may become a target of a load request for the library file 10 at the time of generation of the load request association information 7.

Second Exemplary Embodiment

A second exemplary embodiment based on the first exemplary embodiment is hereinafter described. In the following, the features of the second exemplary embodiment are mainly described. Configurations in the second exemplary embodiment including configurations same as or similar to the corresponding configurations in the first exemplary embodiment have been given reference numbers same as the reference numbers given in the first exemplary embodiment, and detailed explanation of the corresponding configurations are not repeated herein.

Described herein as an example of this exemplary embodiment is a Java application server (hereinafter simply referred to as "application server") to which the present invention has been applied. This exemplary embodiment is different from the first exemplary embodiment in that deployment of an application, and cancellation of deployment of an application are additionally achievable. The deployment of an application in this context refers to realization of an executable state of an application in the information processing device by allocation of a resource to the application and loading to a memory, for example. Cancellation of deployment of an application in this context is cancellation of the executable state of the application by releasing a resource such as a memory allocated to the application in the executable state in opposition to deployment.

Figure 2:
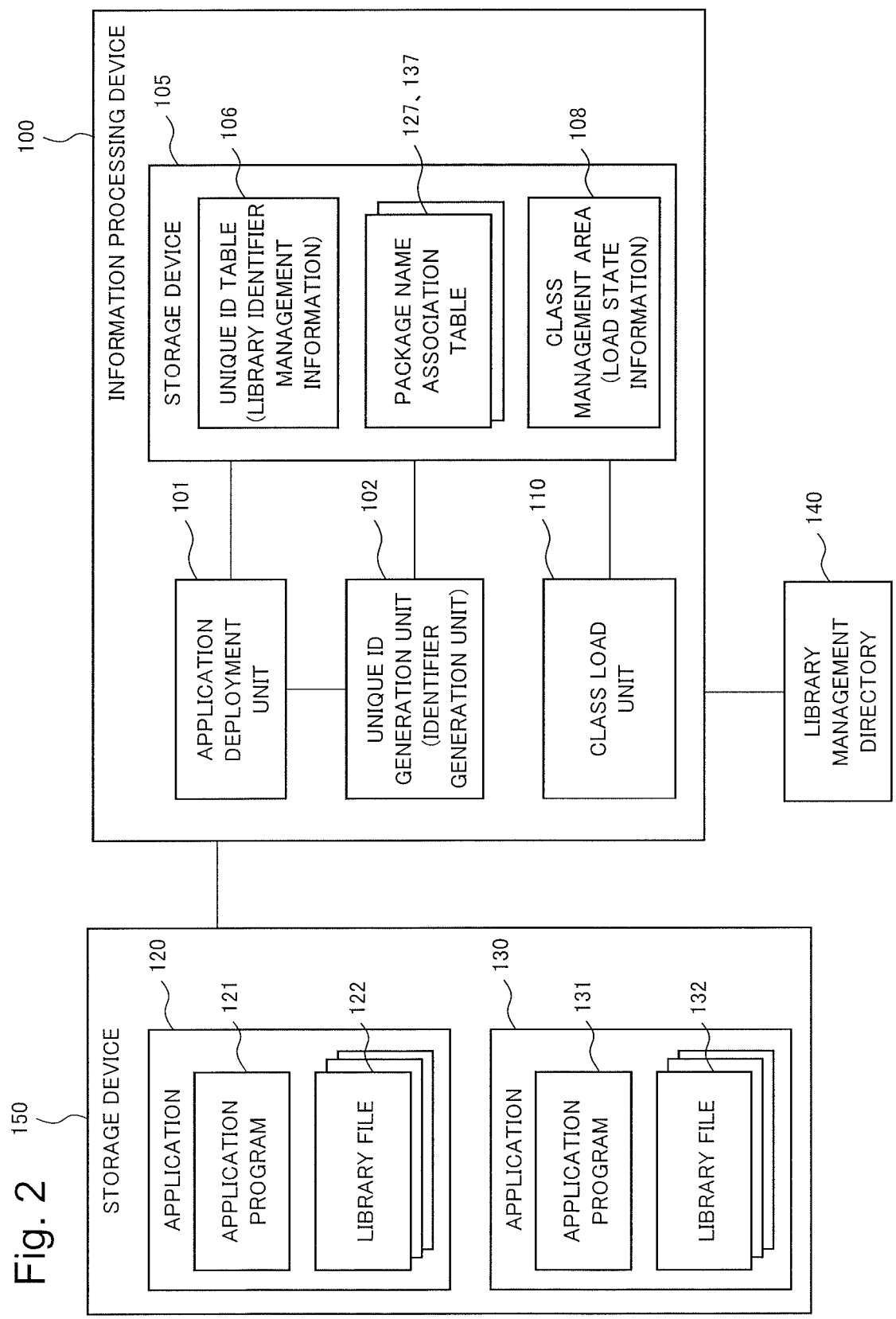
FIG. 2 is a block diagram illustrating a configuration of an application server according to a second exemplary embodiment of the present invention.

A configuration according to this exemplary embodiment is hereinafter described with reference to FIG. 2. FIG. 2 is a block diagram illustrating a configuration of an application server according to the second exemplary embodiment of the present invention.

Referring to FIG. 2, the application server according to this exemplary embodiment includes an information processing device 100, a library management directory 140, and a storage device 150. The library management directory 140 and the storage device 150 may be storage devices such as semiconductor storage devices connected with the information processing device 100. The library management directory 140 and the storage device 150 may be external devices capable of communicating via a communication network such as the Internet and a local area network (LAN). The library management directory 140 and the storage device 150 may be included in an identical storage device, for example.

The information processing device 100 may include circuitly, for example, an ordinary information processing device (computer) operating under control of a computer program (software program) executed by using a CPU (not shown). Alternatively, respective units in the circuitly of the information processing device 100 may include dedicated hardware devices, or logic circuits. A hardware configuration example of the information processing device 100 realized by a computer will be described later with reference to FIG. 10.

The storage device 150 is capable of storing applications 120 and 130 corresponding to applications as targets for deployment, execution, and deployment cancellation by the application server according to this exemplary embodiment. The application 120 (130) includes an application program 121 (131), and one or more library files 122 (132).

The application program 121 (131) is an executable program. The application program 121 (131) refers to (uses) the library files 122 (132) by issuing the load request 11 described in the first exemplary embodiment during execution of the application program 121 (131).

Each of the library files 122 (132) is a library file including a group of classes referred to by the application program 121 (131). Each of the library files 122 (132) is based on the library file 10 according to the first exemplary embodiment.

Figure 3:
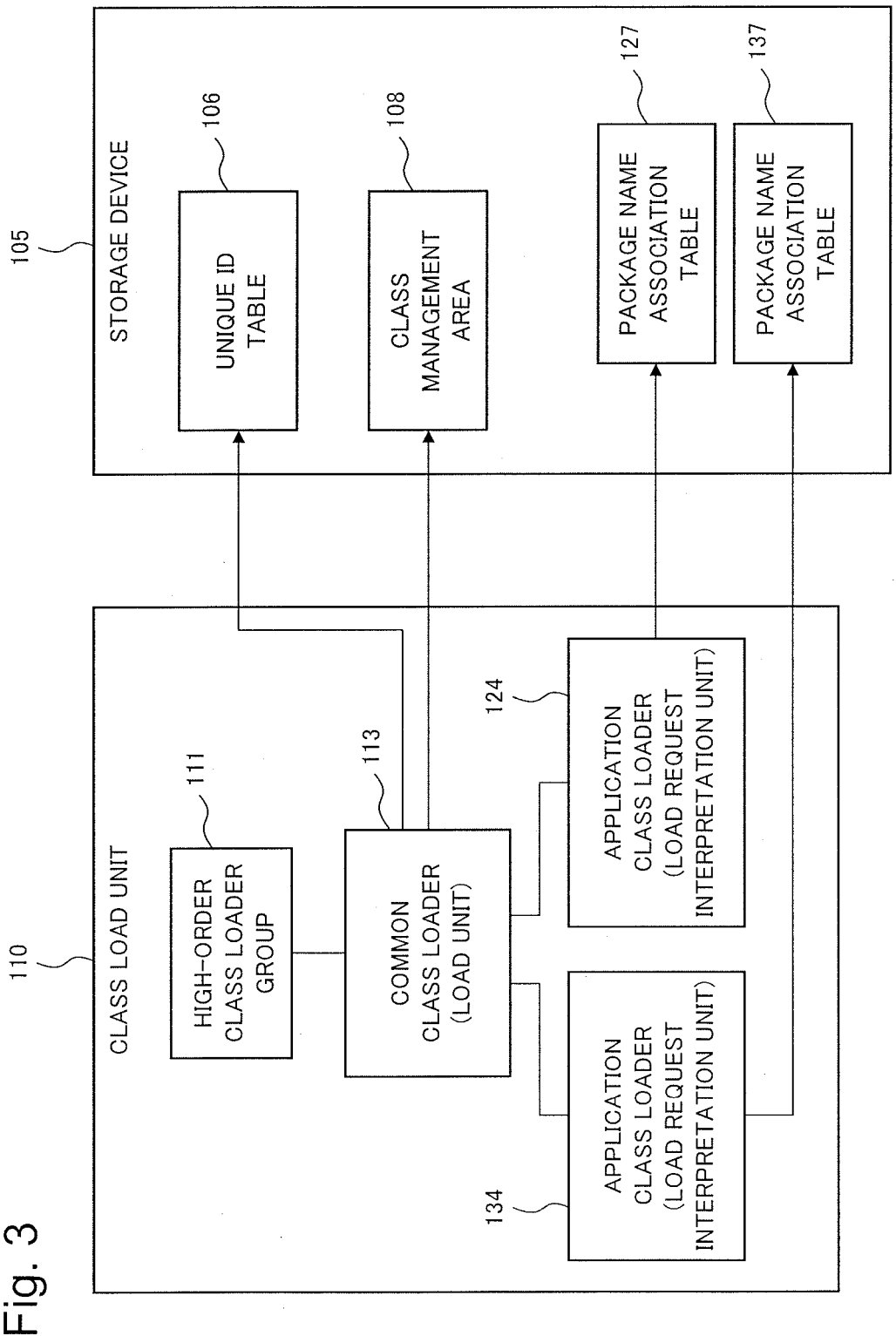
FIG. 3 is a diagram illustrating a configuration of a class load unit 110, and relationship between respective configurations of the class load unit 110 and information stored in a storage device 105 according to the second exemplary embodiment.

The information processing device 100 includes an application deployment unit 101, a unique ID generation unit 102, a class load unit 110, and a storage device 105. The storage device 105 is realized by a semiconductor memory device or a disk device, for example. The storage device 105 is capable of storing a unique ID table (library identifier management information) 106, package association tables 127 and 137, and a class management area 108. Referring to FIG. 3, the class load unit 110 includes a high-order class loader group 111, a common class loader 113, and application class loaders 124 and 134. FIG. 3 is a diagram illustrating a configuration of the class load unit 110, and a relationship between the respective configurations of the class load unit 110 and information stored in the storage device 105 according to this exemplary embodiment.

The information processing device 100 includes the application deployment unit 101 and the unique ID table 106 in addition to the respective elements based on the elements included in the information processing device 1 according to the first exemplary embodiment. In this exemplary embodiment, the identifier information in the first exemplary embodiment is realized as a "unique ID" generated based on hash information about the library file 122 (132), for example. In the following explanation, the "identifier information" is replaced with the "unique ID". For example, the identifier generation unit 102 based on the identifier generation unit 2 according to the first exemplary embodiment is referred to as the unique ID generation unit 102 in the following description. In addition, according to this exemplary embodiment, the load request association information 7 in the first exemplary embodiment is stored in the package association table 127 or 137 for each application.

The application deployment unit 101 is capable of deploying the applications 120 and 130 stored in the storage device 150. When deploying the application 120 (130), the application deployment unit 101 generates an application class loader 124 (134) for each application. The application class loader 124 (134) will be detailed later in the description of the class load unit 110.

The application deployment unit 101 instructs the unique ID generation unit 102 to generate a unique ID and the package association tables 127 and 137 by transferring the library files 122 (132) to the unique ID generation unit 102.

Figure 9:
FIG. 9 is a diagram illustrating an example of a unique ID table 106 according to the second exemplary embodiment.

The application deployment unit 101 further stores, in the storage device 105, the library identifier management information 106 including the unique ID (identifier information) generated by the unique ID generation unit 102 and reference number information representing the number of applications referring to the library file 122 (132) associated with the unique ID. In the exemplary embodiments described hereinbelow, the "number of applications" is regarded as a "quantity" of applications, and also regarded as a "numerical value" from the viewpoint that the number of applications corresponds to an index (parameter) of a "reference number". According to this exemplary embodiment, the library identifier management information 106 is realized as the unique ID table 106 as a specific example. FIG. 9 is a diagram illustrating an example of the unique ID table 106 according to the second exemplary embodiment. Referring to FIG. 9, a unique ID is regarded as a key in the unique ID table 106, and reference number information representing the number of applications referring to the library file 122 (132) associated with the unique ID is stored as a value corresponding to the key.

The application deployment unit 101 further stores a copy of the library files 122 (132) in the library management directory 140.

The application deployment unit 101 is capable of canceling deployment of the deployed applications 120 and 130. More specifically, the application deployment unit 101 removes, based on the library identifier management information, a resource concerning the library file 122 (132) referred to by the application 120 (130) which becomes absent as a result of cancellation of deployment. In this case, the application deployment unit 101 further removes a resource concerning the application 120 (130) for which deployment is canceled. The resource to be removed includes storage information and the like. The specific resource to be removed in this context includes the application class loader 124 (134), the package name association table 127 (137), and the library files 122 (132) copied by the library management directory 140, and others.

The unique ID generation unit 102 is based on the identifier generation unit 2 according to the first exemplary embodiment. In this exemplary embodiment, the unique ID generation unit 102 generates a unique ID (identifier information) and the load request association information 7 by receiving the library files 122 (132) from the application deployment unit 101. A column "item number" in FIG. 9 is a column added only for the purpose of clarification of description, wherefore the column "item number" need not be provided in an actual situation.

The unique ID generation unit 102 stores the generated load request association information 7 in the package name association table 127 (137) (FIG. 3) for each of the application 120 (130). The package name association table 127 (137) is capable of including the load request association information 7 for one or more files included in the library files 122 (132) used by the application 120 (130).

The package name association table 127 (137) includes load request association information 7 representing a relationship between names of all packages included in the library files 122 (132), and unique IDs. The name of package (the package name) in this context is a name of a group binding a number of classes. The one library file 122 (132) is capable of including plurality of packages. In case of Java, a load request is issued as a request for a class (class request) corresponding to an FQCN including a package name and a class name. In other words, according to this exemplary embodiment, a class request corresponds to the load request 11 in the first exemplary embodiment. The load request association information 7 in this exemplary embodiment is an example which manages a relationship between a load request and identifier information (library file) not by a class as a unit of a loading request, but by a package name (group name) including classes.

FIGS. 7 and 8 illustrate an example of the package name association table 127 (137). FIG. 7 is a diagram illustrating an example of the package name association table 127 according to the second exemplary embodiment. FIG. 8 is a diagram illustrating an example of the package name association table 137 according to the second exemplary embodiment. As illustrated in FIGS. 7 and 8, a "package name" is stored as a key in respective pieces of the load request association information 7 included in the package name association table 127 (137), and the "unique ID" associated with the library file 122 (132) including the corresponding package (group of classes) is stored as a value corresponding to the key. A column "item number" in FIGS. 7 and 8 is a column added only for the purpose of clarification of description, wherefore the column "item number" need not be provided in an actual situation.

The structure and contents of the unique ID generation unit 102 are similar to those of the identifier generation unit 2 according to the first exemplary embodiment except for the points described above, wherefore detailed description of these structure and contents is not repeated herein.

As described above, the class load unit 110 includes the high-order class loader group 111, the common class loader 113, and the application class loaders 124 and 134. This structure in the class load unit 110 corresponds to a class loader hierarchical structure in Java. The details of operations and problems arising in an ordinary class loader in Java will be described later. Operations performed by respective units of the class load unit 110 and associated with realization of this exemplary embodiment are hereinafter described.

The high-order class loader group 111 handle a load request for a class which is loaded from a library file not included in the library files 122 (132), such as a system library. In other words, the high-order class loader group 111 is equivalent to class loaders, included in ordinary class loaders in Java, located in orders higher than a common class loader. The details of the operation of the high-order class loader will be described in the section of details of operations and problems of an ordinary class loader in Java described later.

The common class loader 113 is based on the load unit 3 according to the first exemplary embodiment. The application class loader 124 (134) is based on the load request interpretation unit 4 according to the first exemplary embodiment.

According to this exemplary embodiment, the application class loader 124 (134) receives a class request from the executed application 120 (130) after deployment of the application 120 (130) by the application deployment unit 101. The application class loader 124 (134) obtains a unique ID of the library file 122 (132) associated with the class request based on the class request and the package name association table 127 (137). The application class loader 124 (134) outputs an FQCN ("request target information representing a target of the load request 11" in the first exemplary embodiment) corresponding to a target of the class request, and the obtained unique ID to the common class loader 113.

The common class loader 113 performs processing in accordance with a load state of the class corresponding to the target of the class request based on the class management area 108, similarly to the load unit 3 in the first exemplary embodiment.

The class management area 108 is based on the load state information 8 according to the first exemplary embodiment. In this exemplary embodiment, the common class loader 113 registers the state that a class has been loaded based on loading of the class into the class management area 108, for example. In other words, the class management area 108 includes a program code corresponding to an entity of the loaded class, in addition to the information representing that the class has been loaded.

Moreover, according to this exemplary embodiment, the application class loader 124 (134) and the common class loader 113 include processing of the class request for a class not included in the library files 122 (132). More specifically, the application class loader 124 (134) and the common class loader 113 handle this class request by delegating (leaving) the request to the high-order class loader group 111.

The structures and contents of the application class loader 124 (134), and the common class loader 113 are similar to those of the load request interpretation unit 4 and the load unit 3 in the first exemplary embodiment except for the points described above, wherefore detailed description is not repeated herein.

The library management directory 140 is now described. The library management directory 140 is capable of storing the library files 122 (132) copied by the application deployment unit 101. The library management directory 140 is further capable of outputting the stored library file 122 (132) to the common class loader 113 when the common class loader 113 loads a class.

The details of the operations according to this exemplary embodiment thus structured are hereinafter described. In the following description of the operations, the load request 11 is referred to as a "class request". The operations in this exemplary embodiment include an operation for deploying an application (deployment operation), an operation for loading in response to a class request (load operation), and an operation for canceling deployment of an application (deployment cancellation operation).

Figure 4:
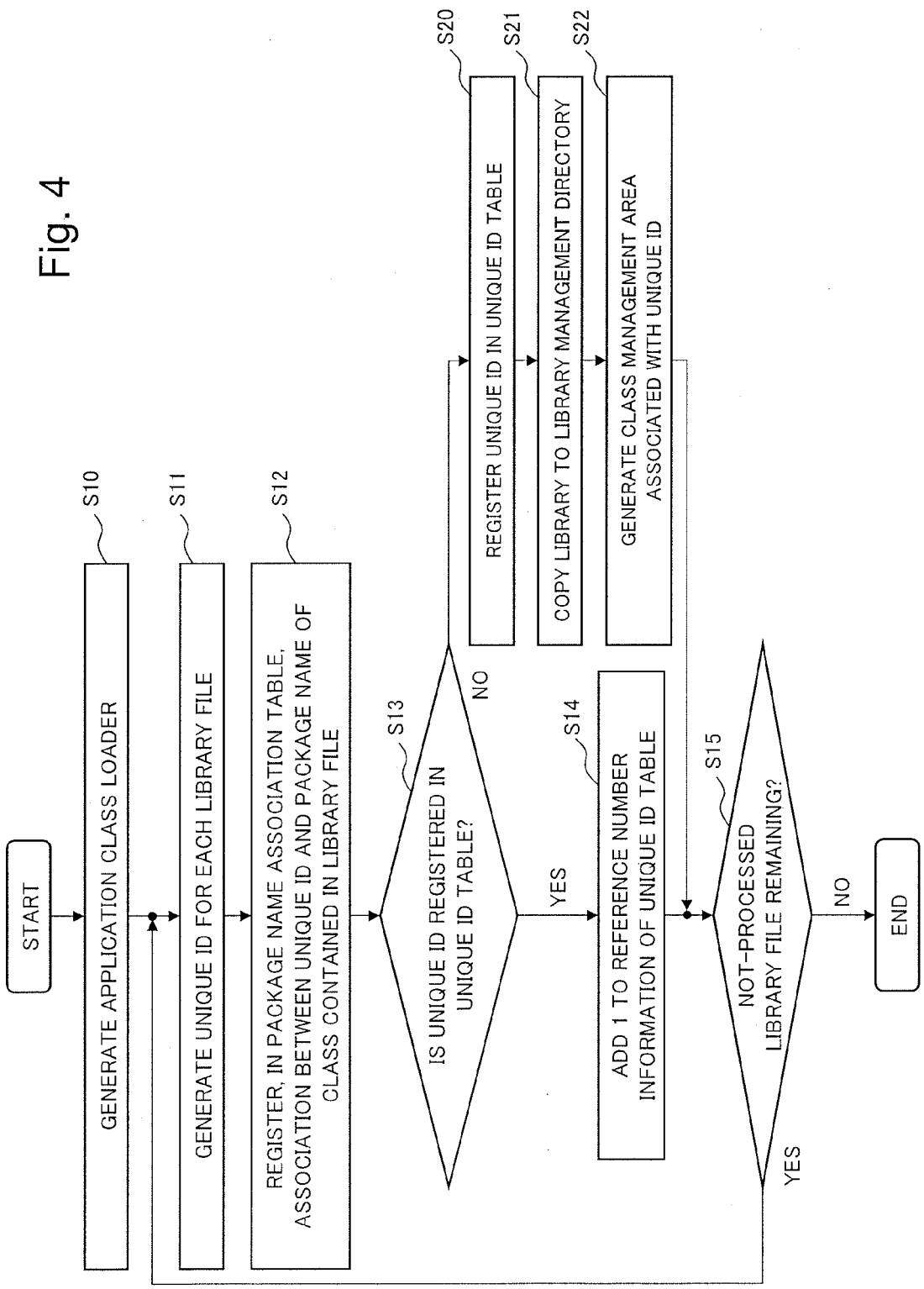
FIG. 4 is a flowchart illustrating an application deployment operation executed by an application deployment unit 101 and a unique ID generation unit 102 according to the second exemplary embodiment.

The application deployment operation is initially described with reference to FIG. 4. FIG. 4 is a flowchart illustrating the application deployment operation executed by the application deployment unit 101 and the unique ID generation unit 102.

To begin with, prerequisites determined in a specific example described hereinbelow are touched upon. According to this exemplary embodiment, it is assumed that the applications 120 and 130 include the set of library files 122 and the set of library files 132, respectively, as two sets of library files with an identical name as a specific example. It is further assumed that, in the two sets of library files 122 and 132 with the identical name, one set include different contents. It is further assumed that the other set of the two sets of library files 122 and 132 with the identical name include identical contents.

It is further assumed that the high-order class loader group 111 and the common class loader 113 of the class load unit 110 are resident in a not-shown main storage device or the like at the time of start of the application deployment operation. The application deployment unit 101 and the unique ID generation unit 102 may be started at the time of initiation of operation. It is further assumed that nothing is stored in the unique ID table 106, the package association tables 127 and 137, and the class management area 108.

An operation executed at the time of deployment of the application 120 is now described under the foregoing prerequisites.

Initially, the application deployment unit 101 receives an instruction of deployment of the application 120 from a user via a not-shown input device or the like. In response to this instruction, the application deployment unit 101 generates the application class loader 124 associated with the application 120 as a subordinate of the common class loader 113 of the class load unit 110 (step S10).

When a plurality of the library files 122 are present, the operations from step S11 to step S15 may be executed for each of the library files 122. According to this specific example, there exist the two library files 122. Accordingly, the operations from step S11 to step S15 are executed twice in total for the respective library files 122. In the following description from step S11 to step S15, the "library file 122" refers to the "one library file 122".

The application deployment unit 101 pass the library file 122 included in the application 120 to the unique ID generation unit 102, and instructs the unique ID generation unit 102 to generate a unique ID and the load request association information 7 (package association table 127). The unique ID generation unit 102 initially generates a unique ID for each of the library files 122 (step S11). More specifically, the unique ID generation unit 102 obtains hash information for the library file 122 by a hash function, for example. Then, the unique ID generation unit 102 determines the obtained hash information as a unique ID for the corresponding library file 122.

The unique ID generation unit 102 registers a relationship between a name of a package included in the library file 122 and the unique ID in the package name association table 127 (step S12). More specifically, the unique ID generation unit 102 initially extracts package names of all classes included in the library file 122. Then, the unique ID generation unit 102 regards the extracted package names as keys, and registers the unique ID generated in step S11 in the package association table 127 as a value for the corresponding key. The package association table 127 may be generated by the unique ID generation unit 102 prior to registration of initial information.

As a final process of step S12, the unique ID generation unit 102 returns the unique ID to the application deployment unit 101. The application deployment unit 101 examines whether or not the generated unique ID has been registered in the unique ID table 106 (step S13). According to this specific example, the unique ID associated with the library file 122 is not registered in the unique ID table 106.

When the unique ID is not registered (step S13: NO), the application deployment unit 101 registers the generated unique ID in the unique ID table 106 while setting reference number information to "1". Then, the application deployment unit 101 copies the library file 122 to the library management directory 140 (step S21). When copying the library file 122, the application deployment unit 101 copies the library file 122 in such a manner that the library file 122 is searchable based on the unique ID. For example, the application deployment unit 101 stores a file copied from the library file 122 as a file with a name including the unique ID. Furthermore, the application deployment unit 101 generates the class management area 108 associated with the unique ID (step S22).

When there exists the library file 122 not processed after these processes, the application deployment unit 101 executes processes after step S11 for the library file 122 not processed (step S15).

FIG. 7 illustrates an example of the package association table 127 associated with the application 120 thus generated. For example, the load request association information 7 associated with the "item number" column of "A1" in FIG. 7 (hereinafter referred to as "item of A1") shows that a package with a package name of "org.apache.commons.beanutils.converters" is included in the library file 122 with a unique ID of "0c41fee1b50b22ac23ac99388f649b9a634e8346". Each of four items of A1 through A4 having the identical unique ID column is information about four packages included in the library file 122 with the identical ID of "0c41fee1b50b22ac23ac99388f649b9a634e8346". Each of items of A5 and A6 is information for two packages included in the library file 122 with an identical ID of "f6f66e966c70a83ffbdb6f17a0919eaf7c8aca7f".

The application 120 is deployed in this manner.

An operation executed when the application 130 is deployed subsequently to the deployment of the application 120 is hereinafter described. As described above, the application 130 includes the library file 132 having a name identical to the name of the library file 122, but including contents different from the contents of the library file 122. The application 130 further includes the other library file 132 having the name identical to the name of the library file 122 and including contents identical to the contents of the library file 122.

The operation for deploying the library file 132 having the name identical to the name of the library file 122 and including contents different from the contents of the library file 122 is similar to the operation executed for the library file 122 in the deployment operation of the application 120. The operations from step S10 to step S12 for the library file 132 having the name identical to the name of the library file 122 and including the contents identical to the contents of the library file 122 are similar to the corresponding operations for deploying the application 120 described above. In step S11, the unique ID generation unit 102 generates a new unique ID for the library file 132 having the name identical to the name of the library file 122 and including the contents different from the contents of the library file 122. On the other hand, the unique ID generation unit 102 generates a unique ID identical to the unique ID of the library file 122 for the library file 132 having the name identical to the name of the library file 122 and including the contents identical to the contents of the library file 122.

In step S13, the unique ID for the library file 132 having the name identical to the name of the library file 122 and including the contents identical to the contents of the library file 122 has been already registered in the unique ID table 106. When it is determined that the unique ID has been registered (step S13: YES), the application deployment unit 101 adds "1" to the reference number information associated with the corresponding unique ID to update the unique ID table 106 (step S14). FIG. 9 illustrates an example of the unique ID table 106 after deployment of the application 130. An item of C1 in FIG. 9 corresponds to information updated as the reference number "2" for the library file 122 (132) having the identical name and the identical contents. When there remains the library file 132 not processed, the application deployment unit 101 executes processes after step S11 (step S15).

FIG. 8 illustrates an example of the package association table 137 associated with the application 130 generated in the manner described above. In FIG. 8, each of items of B1 through B4 is information for the library file 132 having a name identical to the name of the library file 122 of the application 120 and including contents identical to the contents of the library file library file 122. Each of items B5 and B6 is information for two packages included in the library 132 having a name identical to the name of the library file 122 and including contents different from the library file 122 (unique ID "37c659e57293656ebef1a247fc6ceb738ebdfc74").

The application 130 is deployed in this manner.

The application deployment unit 101 may perform the application deployment operation executed by an ordinary Java application server at arbitrary timing including before and after a series of application deployment operations illustrated in FIG. 4.

The application deployment operation is executed in this manner.

Figure 5:
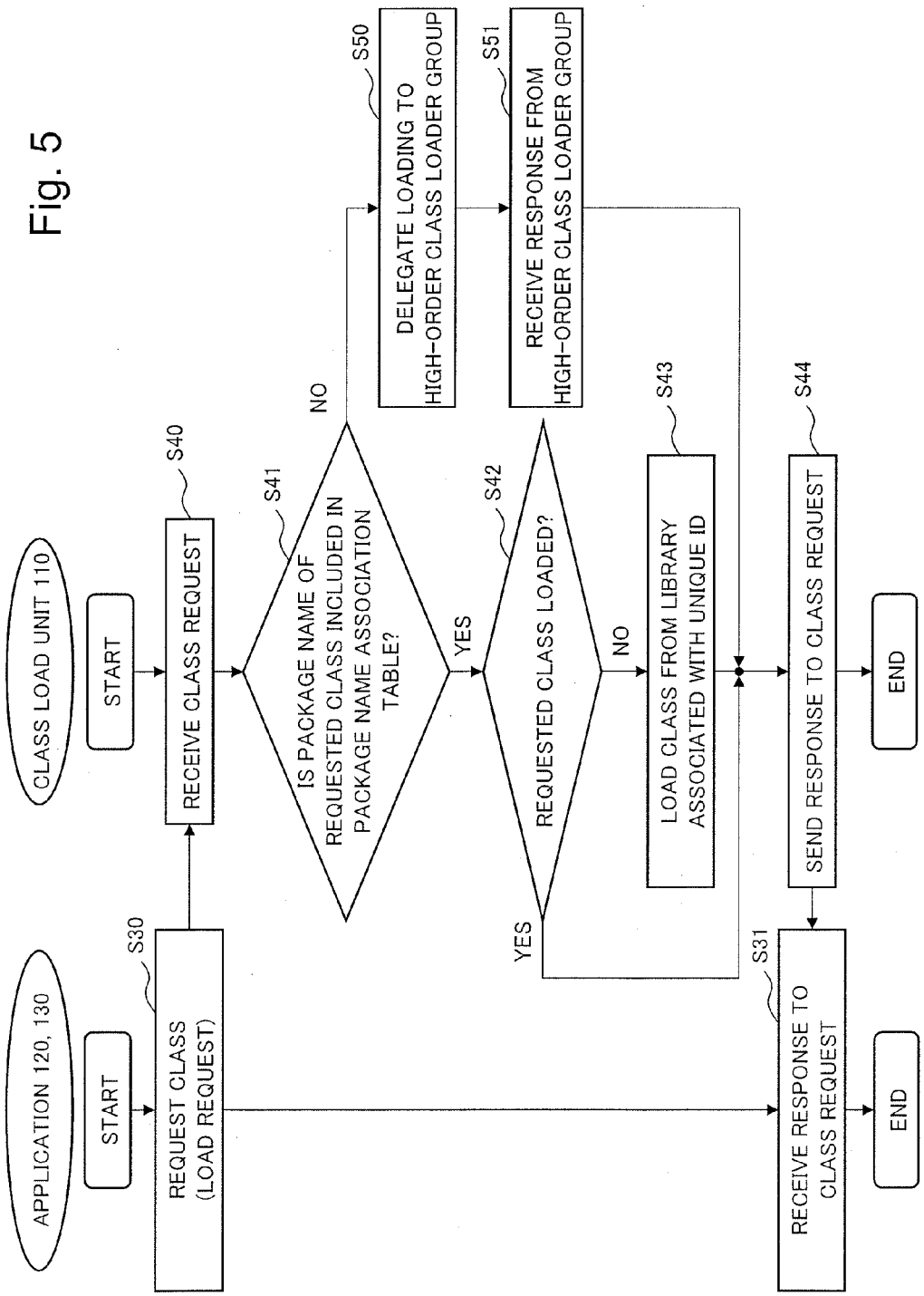
FIG. 5 is a flowchart illustrating a load operation executed by applications 120 and 130, and the class load unit 110 in response to a class request according to the second exemplary embodiment.

The load operation executed in response to a class request is hereinafter described with reference to FIG. 5. FIG. 5 is a flowchart illustrating the load operation executed by the applications 120 and 130 and the class load unit 110 in response to a class request according to the second exemplary embodiment. The class request is issued after each of the deployed application programs 121 and 131 is started. In the following description, the "executed application program 121 (131)" is abbreviated as the "application 120 (130)".

Initially described is the load operation executed when a class request with an identical name is issued from a plurality of applications to the library file including different contents. To begin with, the load operation executed when the application 120 requests "org.apache.commons.logging.LogFactory" class is described. The FQCN for this class request is "org.apache.commons.logging.LogFactory". The package name for this class request is "org.apache.commons.logging" not including ".LogFactory" provided at the end of the FQCN.

The library files 122 and 132 including this class have an identical name but different contents. The package name for this class request is registered in the item of A5 in the package name association table 127 (FIG. 7) and in the item of B5 of the package name association table 137 (FIG. 8) while associated with different unique IDs. In the following description, items obtained (read) from the package name association tables 127 and 137, or the unique ID table 106 are described in a simple manner using item numbers illustrated in FIGS. 7 through 9. For example, information in the "unique ID" column obtained from the item of A1 in the package name association table 127 is referred to as "unique ID of item A1".

The application 120 requests the above-mentioned class (step S30).

In this case, the application class loader 124 (134) of the class load unit 110 associated with the corresponding application 120 (130) receives the class request (step S40). More specifically, the application class loader 124 receives the class request issued from the application 120.

The application class loader 124 (134) examines whether or not the package name of the requested class is present in the associated package name association table 127 (137) (step S41). More specifically, the application class loader 124 searches the package name association table 127 associated with the application 120 using the package name "org.apache.commons.logging" of the requested class as a key. The application class loader 124 determines that the packages name association table 127 included the package name of the requested class based on the state that the unique ID (unique ID of item A5) has been obtained from the item of A5 in FIG. 7.

When the package name of the class is present in the package name association table 127 (137) (step S41: YES), the application class loader 124 (134) outputs the FQCN corresponding to the target of the class request, and the obtained unique ID to the common class loader 113. The common class loader 113 examines whether or not the class corresponding to the target of the class request has been loaded in the class management area 108 associated with the unique ID (step S42). According to the specific example, nothing is loaded to the class management area 108. Accordingly, the common class loader 113 determines that the requested class is not loaded.

When the requested class is not loaded (step S42: NO), the common class loader 113 loads a class from the library file 122 (132) associated with the unique ID (step S43).

More specifically, the common class loader 113 obtains the library file 122 copied with the file name of the unique ID of the item A5 from the library management directory 140. Then, the common class loader 113 loads a program including the requested class from the obtained library file 122 into the class management area 108.

Finally, the common class loader 113 makes a response to the class request via the application class loader 124 (134) (step S44). More specifically, the common class loader 113 returns, to the application 120 via the application class loader 124, an object including information representing the position to which the class has been loaded.

The application 120 (130) receives the response to the class request (step S31).

Described next is the load operation executed when the application 130 requests the "org.apache.commons.logging.LogFactory" class identical to the foregoing class. In the following description, points of the operation different from the foregoing operation are briefly touched upon.

Initially, the application 130 requests a class corresponding to an FQCN identical to the FQCN of the application 120 (step S30).

The application class loader 134 of the class load unit 110 receives the class request (step S40).

The application class loader 134 determines that the package name of the requested class is included based on the state that the unique ID (unique ID of item B5) associated with the package name of the requested class has been obtained from the package name association table 137 (step S41). Then, the application class loader 134 outputs the FQCN and the unique ID of the item B5 to the common loader 113 (step S41: YES). As described above, the unique ID of the item B5 is different from the unique ID of the item A5.

The common class loader 113 determines that the class associated with the FQCN is not loaded into the class management area 108 associated with the unique ID of the item B5 (step S42).

When the requested class is not loaded (step S42: NO), the common class loader 113 loads a program including the requested class from the library file 132 associated with the unique ID of the item B5 to the class management area 108 in a manner similar to the manner described above (step S43).

Finally, the common class loader 113 returns, via the application class loader 134, an object including information representing the position to which the class has been newly loaded as a response to the class request (step S44).

Accordingly, even when class requests with an identical name are issued from a plurality of applications to library files including different contents, the class load unit 110 is capable of separately loading the library files associated with the respective applications.

Described next is the load operation executed when requests for loading library files including identical contents are issued from a plurality of applications. The load operation executed when the applications 120 and 130 successively request "org.apache.commons.beanutils.converters.DateConverter" class is hereinafter described as an example.

The library files 122 and 132 including this class have an identical name and identical contents. Accordingly, the package name "org.apache.commons.beanutils.converters" is registered in the item A1 of the package name association table 127 (FIG. 7) and in the item B1 of the package name association table 137 (FIG. 8) while associated with an identical unique ID.

Initially, the application 120 requests the foregoing class (step S30).

In this case, the application class loader 124 of the class load unit 110 receives the class request (step S40). The application class loader 124 further obtains the unique ID (unique ID of item A1) associated with the package name of the requested class from the package name association table 127 (step S41). Then, the application class loader 124 outputs the FQCN and the unique ID of the item A1 to the common class loader 113 (step S41: YES).

The common class loader 113 determines that the corresponding class is not loaded to the class management area 108 (step S42). The common class loader 113 loads a program including the class from the library file 122 associated with the unique ID of the item A1 (step S43). Then, the common class loader 113 makes a response to the class request via the application class loader 124 (step S44).

Described next is the load operation executed when the application 130 requests "org.apache.commons.beanutils.converters.DateConverter" class identical to the class requested by the application 120.

Initially, the application 130 requests a class corresponding to an FQCN identical to the FQCN requested by the application 120 (step S30).

In this case, the application class loader 134 of the class load unit 110 receives the class request (step S40). The application class loader 134 further obtains the unique ID (unique ID of item B1) associated with the package name of the requested class from the package name association table 137 (step S41). Then, the application class loader 134 outputs the FQCN and the unique ID of the item B1 to the common class loader 113 (step S41: YES). As described above, the unique ID of the item B1 is identical to the unique ID of the item A1.

The common class loader 113 determines that the class associated with the FQCN has been already loaded into the class management area 108 associated with the unique ID of the item B1 (step S42).

When it is determined that the requested class has been loaded (step S42: YES), the common class loader 113 returns, via the application class loader 134, an object including information indicating the position to which the class has been loaded, as a response to the class request (step S44). The information included in this response and indicating the position to which the class has been loaded corresponds to information indicating the position to which the class previously requested from the application 120 has been loaded from the library file 122 associated with the unique ID of the item A1 at the time of loading of this class (step S43).

The class load unit 110 is capable of avoiding multiple loading of the library file 122 (132) including identical contents in this manner.

Described next is the load operation executed when a class not included in the library files 122 and 132 is requested. The load operation executed when the application 120 or 130 requests "foo.Bar" class is described as an example. It is assumed that the class "foo" is not included either in the library file 122 or 132.

The application 120 requests the foregoing class (step S30).

In this case, the application class loader 124 (134) of the class load unit 110 receives the class request (step S40). The application class loader 124 (134) further searches the package name association table 127 (137) using a package name "foo" (step S41). However, the application class loader 124 (134) does not obtain a unique ID associated with the package name "foo" (step S41: NO). Accordingly, the application class loader 124 (134) delegates the load processing to the high-order class loader group 111 via the communication class loader 113 (step S50). More specifically, the application class loader 124 (134) notifies the common class loader 113 about only FQCN "foo.Bar" of the requested class. When not notified about the unique ID, the common class loader 113 delegates loading of the "foo.Bar" class to the high-order class loader group 111 present in a higher order.

The subsequent operations are similar to the corresponding operations executed by an ordinary class loader in Java. More specifically, the common class loader 113 subsequently receives, from the high-order class loader group 111, a response to the class request (step S51). Then, the common class loader 113 makes a response to the application 120 (130) via the application class loader 124 (134) based on the received response (step S44).

The class load unit 110 simultaneously realizes both the mechanism of ordinary Java class loading and the operation according to this exemplary embodiment in this manner.

The load operation in response to a class request is executed in the manner described above.

Figure 6:
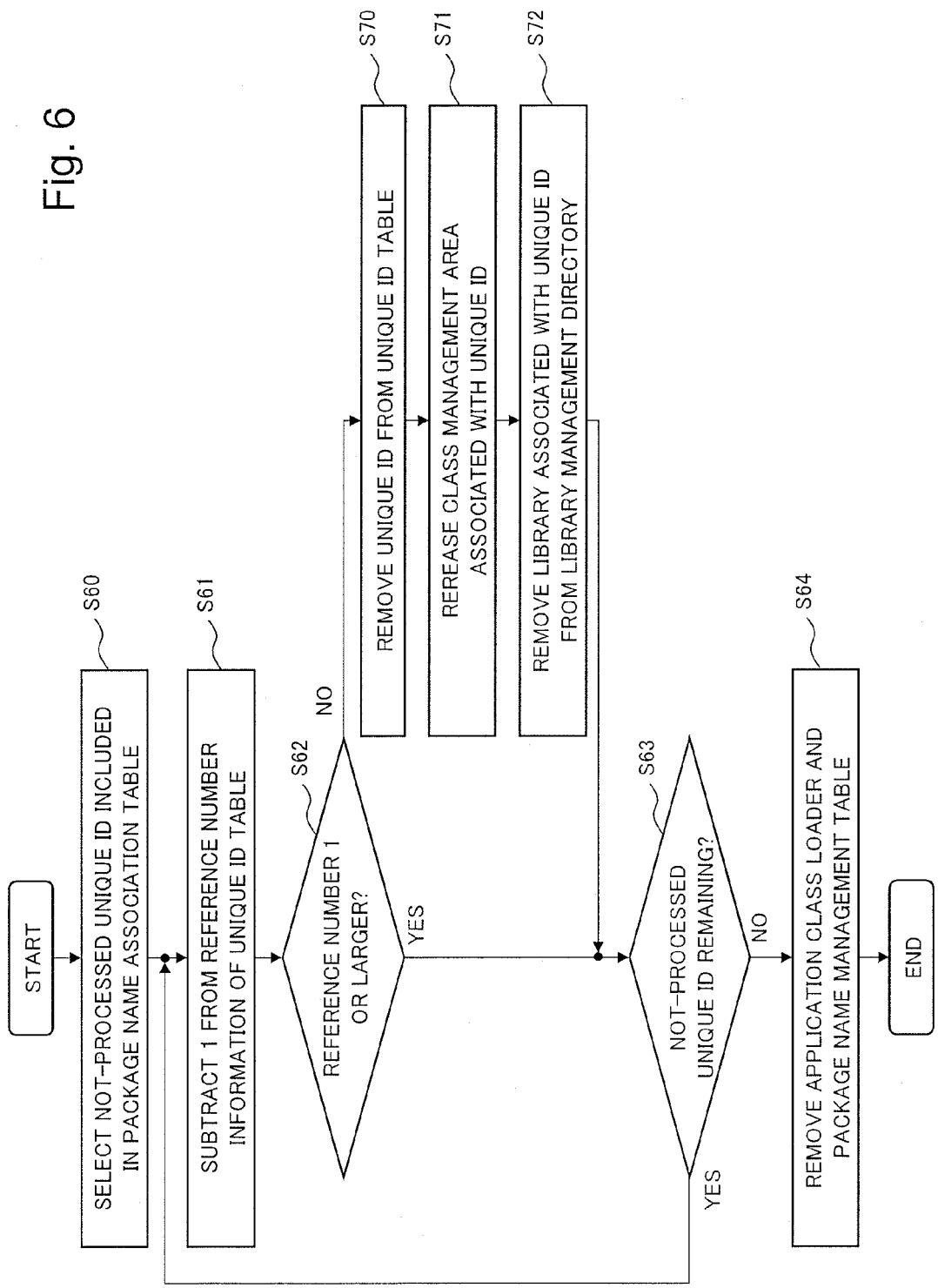
FIG. 6 is a flowchart illustrating an operation for canceling application deployment executed by the application deployment unit 101 according to the second exemplary embodiment.

The application deployment cancellation operation is hereinafter described with reference to FIG. 6. FIG. 6 is a flowchart illustrating operations for canceling application deployment executed by the application deployment unit 101 according to the second exemplary embodiment. The following operations are executed by the application deployment unit 101 to cancel deployment of the application 120 or 130 in the deployed state described above.

Initially, the application deployment unit 101 receives an instruction for canceling deployment of the application 120 or 130 from the user via the not-shown input device or the like. In this case, the application deployment unit 101 selects a not-processed unique ID included in the package name association table 127 or 137 associated with the application 120 or 130 for which deployment is canceled from the package name association table 127 or 137 (step S60). In other words, the application deployment unit 101 executes operations from step S61 to S63 for each unique ID included in the package name association table 127 or 137.

The application deployment unit 101 subtracts "1" from reference number information associated with the selected unique ID in the unique ID table 106 (step S61).

The application deployment unit 101 subsequently determines whether or not the reference number information is "1" or larger after the subtraction in step S61 (step S62).

When the reference number information is "1" or larger (step S62: YES), the application deployment unit 101 recognizes that the application 120 or 130 including the library file 122 or 132 associated with the corresponding unique ID is present. The application deployment unit 101 ends the deployment process associated with the corresponding unique ID. When there remains a unique ID not processed, the application deployment unit 101 returns to step S61 for processing the not-processed unique ID (step S63).

On the other hand, when the reference number information is not "1" or larger (i.e., the reference number information is "0") (step S62: NO), the application deployment unit 101 recognizes that the application including the library file 122 or 132 associated with the corresponding unique ID becomes absent. The application deployment unit 101 removes information, a resource and others concerning the library file 122 or 132.

More specifically, the application deployment unit 101 removes an entry of the corresponding unique ID from the unique ID table 106 (step S70). In addition, the application deployment unit 101 abandons the class management area 108 associated with the corresponding unique ID (step S71). As a result, a memory occupied by the loaded library file 122 or 132 is released. The application deployment unit 101 further removes the library file 122 or 132 associated with the corresponding unique ID from the library management directory 140 (step S72). When there remains a not-processed unique ID, the application deployment unit 101 returns to step S61 for processing the not-processed unique ID (step S63).

More specifically, at the time of cancellation of deployment of either one of the applications 120 and 130, an entry of the item C1 in the unique ID table 106 illustrated in FIG. 9, and the library file 122 (132) and the class management area 108 associated with the unique ID of item C1 are not removed. An entry of either the item C2 or the item C3 in the unique ID table 106 is removed. In addition, the library file 122 (132) associated with either the unique ID of the item C2 or the unique ID of the item C3, and the class management area 108 associated with either the unique ID of the item C2 or the unique ID of the item C3 are removed.

After processing all unique IDs included in the package name association table 127 or 137 (step S63: NO), the application deployment unit 101 removes the application class loader 124 or 134, and the package name association table 127 or 137, associated with the application 120 or 130 for which deployment is canceled (step S64).

Deployment of the application 120 or 130 is canceled in this manner. The application deployment unit 101 is capable of controlling retention and removal of the resource concerning the library files 122 and 132 based on the unique ID table 106 at the time of cancellation of deployment of applications.

The application deployment unit 101 may execute the application deployment cancellation operation performed by an ordinary Java application server at arbitrary timing including before and after the series of application deployment cancellation operations illustrated in FIG. 6.

The application deployment cancellation operation is executed in the above-described manner.

The details of operations and problems of an ordinary class loader in Java are hereinafter described as final explanation of the operation.

In case of a Java application server, in general, a plurality of class loaders form as a hierarchical structure. At the time of loading of a class, a delegation model detailed below is used.

According to this delegation model, a library file corresponding to a load target is defined (associated) for each class loader. When a class request is issued from an application to a certain class loader, the class loader returns an associated class (object) when the requested class is a class already loaded.

However, when the requested class is not loaded, the class loader delegates loading to a high-order class loader. This high-order class loader recursively executes similar operation. When the requested class is a class not loaded by the highest-order class loader in the hierarchy, the highest-order class loader loads the class when the class is included in a defined library file. The highest-order class loader returns the loaded class to a sub-class loader located in the one-class lower order. When the requested class is not included in the defined library file, the highest-order class loader returns, to the sub-class loader, a response indicating that loading of the requested class is not completed. Thereafter, similar operation is recursively executed by the sub-class loader.

When there exist a plurality of libraries each of which includes a class with an identical name, a class included in a library file corresponding to a load target of a high-order class loader in the hierarchical structure is preferentially loaded in this manner.

An end of the hierarchical structure of the class loader generates an application class loader for each of a plurality of applications deployed in the application server. The application class loader determines a program and a library file included in an application module as a load target. The class loader for each application is capable of separating a class name space for each application. For example, when a class having an identical name and different contents is present in each of a library file of an application A and a library file of an application B, class loaders of the two applications are capable of separately loading the classes with the identical name.

The problems described in the section "BACKGROUND ART" arise from this structure of the ordinary class loader. One of the problems is that loading of classes having an identical name and including different contents is difficult when the classes are included in a library file corresponding to a target of loading by a low-order class loader. More specifically, an ordinary class loader is difficult to switch between loading from a library file for each application in a certain case, and loading from a library file of a system corresponding to a target of loading by a high-order class loader in another case. This problem comes from the point that a library file corresponding to a target of loading by the high-order class loader is always given priority. Another problem is that the class loaders of the respective applications load a library file including completely identical contents for each application. As a result, the quantity of memory usage increases. This problem is produced from the point that the application class loaders do not have a mechanism allowing uniform management of libraries to be loaded.

These problems arising from the structure of the ordinary class loader are solved according to this exemplary embodiment. More specifically, the class load unit 110 in this exemplary embodiment is capable of preferentially loading the library file 122 (132) included in the application 120 (130). In other words, the information processing device 100 according to this exemplary embodiment is capable of switching a library file to be preferentially loaded depending on whether or not the library file 122 (132) is to be included in the application 120 (130). Simultaneously, the class load unit 110 is capable of avoiding multiple loading of a library file including identical contents.

The above-mentioned points are the details of the operations and the problems of the ordinary class loader in Java.

As described above, this exemplary embodiment offers advantages similar to the advantages of the first exemplary embodiment described above, and further offers an advantage that resources such as library files and memories are appropriately managed at the time of deployment and cancellation of deployment of applications.

This advantage comes from the point that the application deployment unit 101 manages the number of applications referring to a library file for each unique ID based on the unique ID table 106.

Modified Examples of Second Exemplary Embodiment

This exemplary embodiment may be modified in the following manners, for example.

For example, a part of the function of the application deployment unit 101 described above may be executed by another function unit. For example, in accordance with an ordinary custom of JAVA, the class load unit 110 may manage information and others stored in the storage device 105 in the following manner. The application deployment unit 101 notifies the common class loader 113 about a generated unique ID and a path of the library file 122 (132) after generation of the unique ID (step S11 in FIG. 4). Then, the common class loader 113 may manage the unique ID table 106 and the class management area 108 including generation of the table 106 and the area 108, and copy the library file 122 (132) to the library management directory 140. Similarly, at the time of application deployment cancellation, the common class loader 113 may perform processing for the unique ID table 106, the class management area 108, and the library management directory 140.

<Description of Hardware Configuration Example>

The respective units illustrated in FIGS. 1 through 3 in the respective exemplary embodiments described above may be realized by independent hardware circuits, or may be regarded as function (process) units (software modules) of a software program. However, divisions of the respective units illustrated in these figures are only formed for convenience of explanation, and various types of configurations are assumable at the time of actual mounting. A hardware environment as an example of these configurations is hereinafter described with reference to FIG. 10.

Figure 10:
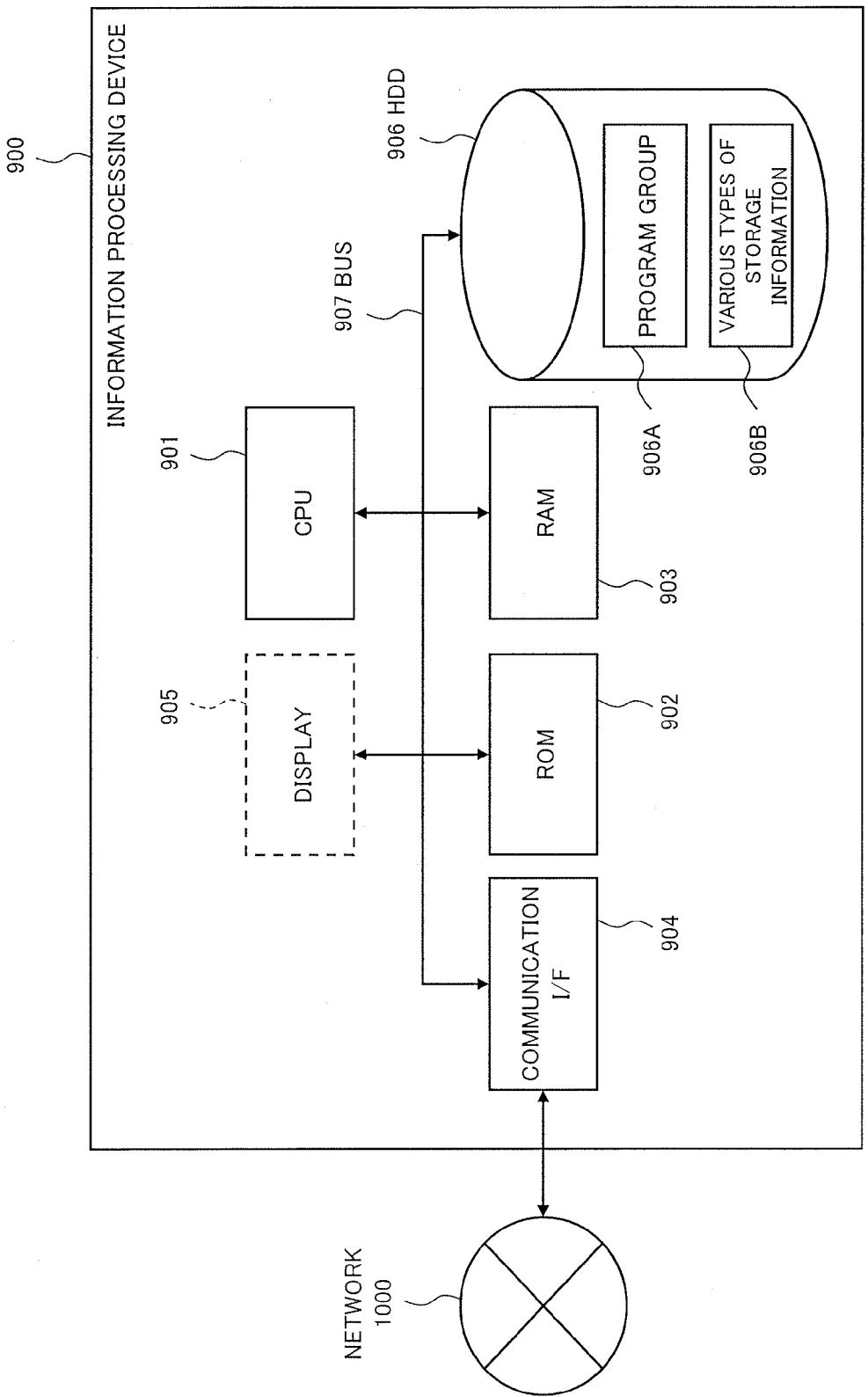
FIG. 10 is a diagram illustrating an example of a configuration of a computer (information processing device) applicable to an information processing device or an application server according to the respective exemplary embodiments of the present invention, and modified examples thereof.

FIG. 10 is a diagram illustrating an example of a configuration of a computer (information processing device) applicable to an information processing device or an application server according to the respective exemplary embodiments of the present invention and modified examples thereof. More specifically, FIG. 10 illustrates a hardware environment corresponding to a configuration of a computer realizable at least one of the information processing devices 1 and 100 according to the respective exemplary embodiments described above, and capable of realizing the respective functions according to the respective exemplary embodiments described above.

A computer 900 illustrated in FIG. 10 includes a CPU (Central Processing Unit) 901, a ROM (Read Only Memory) 902, a RAM (Random Access Memory) 903, a communication interface (I/F) 904, a display 905, and a hard disk device (HDD) 906, all of which units 901 through 906 are connected with each other via a bus 907. When the computer illustrated in FIG. 10 functions as the information processing devices 1 and 100, the display 905 is not necessarily required.

The communication interface 904 is an ordinary communication function for realizing communication between the respective computers according to the respective exemplary embodiments described above. The hard disk device 906 stores a program group 906A and various types of storage information 906B. The program group 906A is a computer program for realizing functions associated with the respective blocks (respective units) illustrated in FIGS. 1 through 3 described above, for example. The various types of storage information 906B correspond to the load request association information 7, the load state information 8, the libraries 10, 122, and 132, the unique ID table 106, the class management area 108, and the package name association tables 127 and 137 illustrated in FIGS. 1 through 3, for example. In this hardware configuration, the CPU 901 controls overall operation of the computer 900.

The present invention described with reference to the respective exemplary embodiments presented by way of example is practiced based on execution of a computer program capable of realizing the functions illustrated in the block configuration diagrams (FIGS. 1 through 3) and the flowcharts (FIGS. 4 through 6) referred to in the descriptions of the respective exemplary embodiments, after the computer program is supplied and read to the CPU 901 of the hardware. The computer program supplied to the computer may be stored in the readable and writable temporary storage memory 903, or a non-volatile storage device (storage medium) such as the hard disk device 906.

Ordinary procedures at present are adoptable as the method for supplying the computer program to the respective devices in the foregoing cases, such as a method for installing the computer program to the devices via various types of storage media such as a floppy disk (registered trademark) and a CD-ROM, and a method for downloading the computer program from the outside via the communication network 100 such as the Internet. In view of these cases, it is considered that the present invention is realizable by codes for realizing the computer program, or a storage medium on which these codes are recorded, as a computer-readable storage medium.

Part or all of the foregoing exemplary embodiments may be described as the following Supplemental Notes. The present invention described by the exemplary embodiments, however, is not limited to the following.

(Supplemental Note 1)

An information processing device includes:

an identifier generation unit which generates identifier information used for identifying contents of a library file for each library file, generates load request association information representing a relationship between the identifier information and request target information representing a part which is included in the library file and may become a target of an intended load request, and outputs the load request association information to a storage device;

a load request interpretation unit which receives a load request from an application currently executed, obtains identifier information about the library file including a target of the load request based on the load request and the load request association information, and outputs request target information representing the target of the load request and the obtained identifier information; and a load unit which manages load state information representing load states of respective parts included in the library file, loads at least a part corresponding to the target of the load request from the library file indicated by the obtained identifier information when the load unit determines that the part corresponding to the target of the load request indicated by the request target information and by the obtained identifier information is not loaded based on the load state information, and makes a response to the load request.

(Supplemental Note 2)

The information processing device according to Supplemental Note 1, wherein the load unit makes the response to the load request without loading the part corresponding to the target of the load request when the load unit determines that the part corresponding to the target of the load request has been loaded based on the load state information.

(Supplemental Note 3)

The information processing device according to Supplemental Note 1 or 2, further including an application deployment unit, wherein at the time of deployment of the application in an executable state, the application deployment unit generates library identifier management information that includes the identifier information, and reference number information representing a number of applications referring to the library file associated with the identifier information, and at the time of deployment cancellation for canceling the executable state of the application, the application deployment unit removes a resource including storage information about the library file referred to by the application that becomes absent as a result of the deployment cancellation, and about the application for which deployment is canceled, based on the library identifier management information.

(Supplemental Note 4)

The information processing device according to any one of Supplemental Note 1 to 3, wherein the identifier generation unit generates the load request association information while using a name of a package included in the library file as the request target information, and the load request interpretation unit obtains identifier information about the library file including the load request target based on a package name of a class corresponding to the load request target, and on the load request association information.

(Supplemental Note 5)

The information processing device according to any one of Supplemental Note 1 to 4, wherein the identifier generation unit obtains hash information about the library file, and generates the identifier information based on the hash information.

(Supplemental Note 6)

A library loading method includes:

generating identifier information used for identifying contents of a library file for each library file;

generating load request association information representing a relationship between the identifier information and request target information representing a part which is included in the library file and may become a target of an intended load request;

outputting the load request association information to a storage device;

when a load request from an application currently executed is received,
  obtaining identifier information about the library file including a target of the load request based on the load request and the load request association information;
  loading at least a part corresponding to the target of the load request from the library file indicated by the obtained identifier information when it is determined that the part corresponding to the target of the load request indicated by request target information representing the load request target and by the obtained identifier information is not loaded based on load state information representing load states of respective parts included in the library file, and registering, in the load state information, that the part corresponding to the target of the load request has been loaded; and
making a response to the load request.

(Supplemental Note 7)

The library loading method according to Supplemental Note 6, wherein the response is made to the load request without loading the part corresponding to the target of the load request when it is determined that the part corresponding to the target of the load request has been already loaded before reception of the load request.

(Supplemental Note 8)

The library loading method according to Supplemental Note 6 or 7, further including:

after generation of the identifier information and before reception of the load request, generating library identifier management information which includes the identifier information, and reference number information representing a number of applications referring to the library file associated with the identifier information; and at the time of deployment cancellation for canceling an executable state of the application, removing a resource including storage information about the library file referred to by the application that becomes absent as a result of the deployment cancellation, and about the application for which deployment is canceled, based on the library identifier management information.

(Supplemental Note 9)

The library loading method according to any one of Supplemental Note 6 to 8, wherein the load request association information is generated while using a name of a package included in the library file as the request target information, and identifier information about the library file including the load request target is obtained based on a package name of a class corresponding to the load request target and on the load request association information.

(Supplemental Note 10)

The library loading method according to any one of Supplemental Note 6 to 9, wherein before generation of the identifier information, obtaining hash information about the library file, and generating the identifier information based on the hash information (Supplemental Note 11)

A non-transitory computer readable medium for storing a computer program which causes a computer to execute:

an identifier generation process for generating identifier information used for identifying contents of a library file for each library file, generatin load request association information representing a relationship between the identifier information and request target information representing a part which is included in the library file and may become a target of an intended load request, and outputting the load request association information to a storage device;

a load request interpretation process for receiving a load request from an application currently executed, obtaining identifier information about the library file including a target of the load request based on the load request and the load request association information; and a load process for managing load state information representing load states of respective parts included in the library file, loading at least a part corresponding to the target of the load request from the library file indicated by the obtained identifier information when it is determined that the part corresponding to the target of the load request indicated by the request target information and by the obtained identifier information is not loaded based on the load state information, and making a response to the load request.

(Supplemental Note 12)

The computer readable medium for storing the computer program according to Supplemental Note 11, wherein the load process makes the response to the load request without loading the part corresponding to the target of the load request when the load process determines that the part corresponding to the target of the load request has been loaded based on the load state information.

(Supplemental Note 13)

The computer readable medium for storing the computer program according to Supplemental Note 11 or 12, further executes an application deployment process, wherein after the identifier generation process, the application deployment process generates library identifier management information which includes the identifier information, and reference number information representing a number of applications referring to the library file associated with the identifier information; and at the time of deployment cancellation for canceling an executable state of the application, removes a resource including storage information about the library file referred to by the application that becomes absent as a result of the deployment cancellation, and about the application for which deployment is canceled, based on the library identifier management information.

(Supplemental Note 14)

The computer readable medium for storing the computer program according to any one of Supplemental Note 11 to 13, wherein the identifier generation process generates the load request association information while using a name of a package included in the library file as the request target information, and the load request interpretation process obtains identifier information about the library file including the load request target based on a package name of a class corresponding to the load request target, and on the load request association information.

(Supplemental Note 15)

The computer readable medium for storing the computer program according to any one of Supplemental Note 11 to 14, wherein the identifier generation process obtains hash information about the library file, and generates the identifier information based on the hash information.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An information processing device comprising:
a memory configured to store program instructions; and
a processor configured to execute the program instructions to implement:
an identifier generation unit which generates identifier information used for identifying contents of a library file for each library file, generates load request association information representing a relationship between the identifier information and request target information representing a part which is included in the library file and may become a target of an intended load request, and outputs the load request association information to a storage device;
a load request interpretation unit which receives a load request from an application currently executed, obtains identifier information about the library file including a target of the load request based on the load request and the load request association information, and outputs request target information representing the target of the load request and the obtained identifier information; and a load unit which manages load state information representing load states of respective parts included in the library file, loads at least a part corresponding to the target of the load request from the library file indicated by the obtained identifier information when the load unit determines that the part corresponding to the target of the load request indicated by the request target information and by the obtained identifier information is not loaded based on the load state information, and makes a response to the load request.

2. The information processing device according to claim 1, wherein the load unit makes the response to the load request without loading the part corresponding to the target of the load request when the load unit determines that the part corresponding to the target of the load request has been loaded based on the load state information.

3. The information processing device according to claim 1, further comprising an application deployment unit, wherein at the time of deployment of the application in an executable state, the application deployment unit generates library identifier management information that includes the identifier information, and reference number information representing a number of applications referring to the library file associated with the identifier information, and at the time of deployment cancellation for canceling the executable state of the application, the application deployment unit removes a resource including storage information about the library file referred to by the application that becomes absent as a result of the deployment cancellation, and about the application for which deployment is canceled, based on the library identifier management information.

4. The information processing device according to claim 1, wherein the identifier generation unit generates the load request association information while using a name of a package included in the library file as the request target information, and the load request interpretation unit obtains identifier information about the library file including the load request target based on a package name of a class corresponding to the load request target, and on the load request association information.

5. The information processing device according to claim 1, wherein the identifier generation unit obtains hash information about the library file, and generates the identifier information based on the hash information.

6. The information processing device according to claim 2, further comprising an application deployment unit, wherein at the time of deployment of the application in an executable state, the application deployment unit generates library identifier management information that includes the identifier information, and reference number information representing a number of applications referring to the library file associated with the identifier information, and at the time of deployment cancellation for canceling the executable state of the application, the application deployment unit removes a resource including storage information about the library file referred to by the application that becomes absent as a result of the deployment cancellation, and about the application for which deployment is canceled, based on the library identifier management information.

7. The information processing device according to claim 2, wherein the identifier generation unit generates the load request association information while using a name of a package included in the library file as the request target information, and the load request interpretation unit obtains identifier information about the library file including the load request target based on a package name of a class corresponding to the load request target, and on the load request association information.

8. The information processing device according to claim 2, wherein the identifier generation unit obtains hash information about the library file, and generates the identifier information based on the hash information.

9. The information processing device according to claim 3, wherein the identifier generation unit generates the load request association information while using a name of a package included in the library file as the request target information, and the load request interpretation unit obtains identifier information about the library file including the load request target based on a package name of a class corresponding to the load request target, and on the load request association information.

10. The information processing device according to claim 3, wherein the identifier generation unit obtains hash information about the library file, and generates the identifier information based on the hash information.

11. The information processing device according to claim 4, wherein the identifier generation unit obtains hash information about the library file, and generates the identifier information based on the hash information.

12. The information processing device according to claim 6, wherein the identifier generation unit generates the load request association information while using a name of a package included in the library file as the request target information, and the load request interpretation unit obtains identifier information about the library file including the load request target based on a package name of a class corresponding to the load request target, and on the load request association information.

13. The information processing device according to claim 6, wherein the identifier generation unit obtains hash information about the library file, and generates the identifier information based on the hash information.

14. The information processing device according to claim 7, wherein the identifier generation unit obtains hash information about the library file, and generates the identifier information based on the hash information.

15. The information processing device according to claim 9, wherein the identifier generation unit obtains hash information about the library file, and generates the identifier information based on the hash information.

16. The information processing device according to claim 12, wherein
the identifier generation unit obtains hash information about the library file, and generates the identifier information based on the hash information.

17. A library loading method comprising:
generating identifier information used for identifying contents of a library file for each library file;
generating load request association information representing a relationship between the identifier information and request target information representing a part which is included in the library file and may become a target of an intended load request;
outputting the load request association information to a storage device;
when a load request from an application currently executed is received,
  obtaining identifier information about the library file including a target of the load request based on the load request and the load request association information;
  loading at least a part corresponding to the target of the load request from the library file indicated by the obtained identifier information when it is determined that the part corresponding to the target of the load request indicated by request target information representing the load request target and by the obtained identifier information is not loaded based on load state information representing load states of respective parts included in the library file, and registering, in the load state information, that the part corresponding to the target of the load request has been loaded; and
  making a response to the load request.

18. The library loading method according to claim 17, wherein
the response is made to the load request without loading the part corresponding to the target of the load request when it is determined that the part corresponding to the target of the load request has been already loaded before reception of the load request.

19. The library loading method according to claim 17, further comprising:
after generation of the identifier information and before reception of the load request, generating library identifier management information which includes the identifier information, and reference number information representing a number of applications referring to the library file associated with the identifier information; and
at the time of deployment cancellation for canceling an executable state of the application, removing a resource including storage information about the library file referred to by the application that becomes absent as a result of the deployment cancellation, and about the application for which deployment is canceled, based on the library identifier management information.

20. A non-transitory computer readable medium for storing a computer program which causes a computer to execute:
an identifier generation process for generating identifier information used for identifying contents of a library file for each library file, generating load request association information representing a relationship between the identifier information and request target information representing a part which is included in the library file and may become a target of an intended load request, and outputting the load request association information to a storage device;
a load request interpretation process for receiving a load request from an application currently executed, obtaining identifier information about the library file including a target of the load request based on the load request and the load request association information; and
a load process for managing load state information representing load states of respective parts included in the library file, loading at least a part corresponding to the target of the load request from the library file indicated by the obtained identifier information when it is determined that the part corresponding to the target of the load request indicated by the request target information and by the obtained identifier information is not loaded based on the load state information, and making a response to the load request.

* * * * *